United States Patent [19]

Smith et al.

[11] 4,020,017
[45] Apr. 26, 1977

[54] EPOXIDES CONTAINING ORGANO-TIN COMPOUNDS AND ELECTRICAL MEMBERS INSULATED THEREWITH

[75] Inventors: James D. B. Smith, Turtle Creek; Robert N. Kauffman, Monroeville, both of Pa.

[73] Assignee: Westinghouse Electric Corporation, Pittsburgh, Pa.

[22] Filed: May 8, 1975

[21] Appl. No.: 575,755

[52] U.S. Cl. .................. 260/2 EC; 174/120 SR; 252/431 R; 260/18 PF; 260/78.3 R; 428/413
[51] Int. Cl.² .................. C08G 59/24; C08G 59/68
[58] Field of Search ........ 260/2 EC, 18 PF, 78.3 R, 260/830 TW, 78.4 EP

[56] References Cited
UNITED STATES PATENTS

| 3,244,670 | 4/1966 | Puchala et al. | 260/47 |
| 3,379,653 | 4/1968 | Ernst et al. | 260/2 |
| 3,622,524 | 11/1971 | Markovitz et al. | 260/2 EC |
| 3,716,598 | 2/1973 | Markovitz et al. | 260/831 |
| 3,792,011 | 2/1974 | Smith et al. | 260/37 EP |

*Primary Examiner*—Harold D. Anderson
*Assistant Examiner*—E. A. Nielsen
*Attorney, Agent, or Firm*—D. P. Cillo

[57] ABSTRACT

A resinous composition is made by: admixing (1) an organo-tin compound, having the structural formula: $R_1R_2R_3SnX$, where $R_1$, $R_2$ and $R_3$ are organic groups, and X is a halide, hydroxide, acetate, butyrate, propionate, or dimethyl phosphate group, effective as a latent catalyst, (2) an amount of a reactive low viscosity epoxide diluent effective to dissolve the organo-tin compound without substantial heating, and (3) a cycloaliphatic epoxide or a glycidyl ester epoxide; wherein the weight ratio of cycloaliphatic epoxide or glycidyl ester epoxide: reactive epoxide diluent is between about 1:0.10 to 1:0.90, in the epoxide mixture; and about 0.00005 part to 0.0005 part by weight of organotin compound is used for each 1 part by weight of epoxide mixture.

This resinous composition can be impregnated into a sheet material and cured to form insulation for an electrical member.

15 Claims, 3 Drawing Figures

EPOXIDES CONTAINING ORGANO-TIN COMPOUNDS AND ELECTRICAL MEMBERS INSULATED THEREWITH

BACKGROUND OF THE INVENTION

Although the first and most important epoxy resins are of the glycidyl ether type, other epoxides have been commercially marketed in recent years. Such materials are the cycloaliphatic epoxides. This type of epoxide is a non-glycidyl ether type and is less viscous and less reactive than the typical diglycidyl ether bisphenol A epoxides. It has generally been used as a diluent and plasticizer for the bisphenol A type resins. As such, the cycloaliphatic epoxides have generally been a minor component in standard resinous compositions, comprising up to about 40 but generally less than 10 parts by weight per 100 parts bisphenol A type resin.

Because of their low viscosity, cycloaliphatic epoxides would make useful solventless impregnating varnishes for insulation which relies on mica, in the form of paper, tape or splittings, in large rotating machines. Gel times of these epoxides, with basic curing agents such as amines and basic accelerators such as imidazoles, are relatively slow however. Gel times of these epoxides with acid anhydride curing agents and basic accelerators such as benzyldimethyl aniline and imidazoles, are suitable for commercial applications, but the storage properties are poor.

Another group of epoxides which have recently been marketed are non-ether epoxide resins of the glycidyl ester type. These epoxides can have a low viscosity, also making them useful in solventless impregnating varnishes, but they also have slow gel times and poor pot life with most standard curing agents and accelerators.

There is a need for a primarily cycloaliphatic epoxide or a glycidyl ester epoxide composition, having both commercially acceptable gel times at about 120° to 180° C and superior storage life, coupled with good tensile and electrical properties. This composition is needed, in an inexpensive, low viscosity form, for use as a solventless impregnating varnish for large rotating apparatus insulation.

Such a composition would require a critical formulation of cycloaliphatic epoxide or glycidyl ester epoxide, inexpensive reactive epoxide diluent, and a latent catalyst. The latent catalyst would be required to give a rapid cure between 120° and 180° C; to be completely miscible with the epoxide so that there will be good impregnation and a uniform cure; to provide a composition having a storage life of about 6 months at 25° C; to be a complete substitute for typical curing agets and accelerators and yet not adversely affect the tensile and electrical properties of the cured resin system.

Several latent catalysts and accelerators have appeared on the commercial scene in recent years. Included are boron trifluoride-monoethylamine, quaternary ammonium halides such as benzyltrimethylammonium chloride, stannous octotate, "extra-coordinate" siliconate salts, triethanolamine borate, triethanolamine titanate and various other metal chelates. However, all of these materials have been rejected for one reason or another, some of them being highly exothermic catalysts.

Puchala et al., in U.S. Pat. No. 3,244,670, attempted to solve problems associated with curing epoxy resins. In that patent, epoxides of cyclohexane derivatives were cured with 0.05 to 2.5 wt%, based on epoxide, of an organo-tin halide used as an accelerator, generally in combination with a carboxylic acid anhydride or a phenolic type curing agent. Among the tin compounds suggested were butyl-tin trichloride, dibutyl-tin dichloride, tributyl-tin hydroxide, triphenyltin chloride, phenyl-tin trichloride, diphenyl-tin dichloride, dibutyl-tin oxide and dibutyl-tin sulfide. While the high concentrations of these tin compounds, in conjunction with a carboxylic acid anhydride, effectively cure epoxy resins at 150° C within 60 minutes; the storage life of the longest lived Puchala et al. compositions is only about 20 days at 25° C. In a somewhat similar fashion, Markovitz in U.S. Pat. No. 3,622,524 reacted 20 to 80 wt% of an organo-tin compound, preferably an oxide, with an organic acid or anhydride to form a solid cross-linking agent for epoxide resins used in high voltage stress environments.

Rogers et al., in U.S. Pat. No. 3,759,866, provided a low viscosity, solventless, impregnating composition using a partially ionically bonded quaternary phosphonium salt, as latent accelerator, in a bisphenol A or novolac epoxy system. The system also contained carboxylic acid anhydride curing agent, and diglycidyl ether of neopentyl glycol reactive diluent. While these compositions provided excellent storage stability of about 6 months at room temperature; the gel times of about 75 to 120 minutes at 135° C, and power factor values of about 8.5 to 10% at 125° C ($100 \times \tan \delta$), while very good, could be improved. In addition, the use of a carboxylic acid anhydride requires the rigorous exclusion of moisture, otherwise the storage properties might be adversely affected.

SUMMARY OF THE INVENTION

It has been discovered that low cost resinous compositions, solving the aforedescribed needs, with dramatically improved storage life and electrical properties, can be made by admixing: (1) 1 part by weight of total epoxide, the epoxide being a mixture of an epoxide containing more than one 1,2 epoxy group per molecule selected from the group consisting of glycidyl ester epoxides and cycloaliphatic epoxides and from 9 to 47 wt% of a reactive, low viscosity epoxide diluent effective to provide a fast cure, and (2) 0.00005–0.0005 part by weight of a latent catalyst organo-tin compound having the structural formula $R_1R_2R_3SnX$, where $R_1$, $R_2$ and $R_3$ are organic radicals, preferably alkyl, benzyl or phenyl groups, and X is a halide, hydroxide, acetate, butyrate, propionate or dimethyl phosphate group. Preferably the organo-tin compound is first mixed with the reactive epoxide diluent, to form a homogeneous, low viscosity, latent catalytic adduct with a long storage lifetime. This is then added to the cycloaliphatic or glycidyl ester epoxide.

This particular combination of cycloaliphatic epoxide or glycidyl ester epoxide, low viscosity reactive diluent and selected organo-tin compounds acting as latent catalysts, without phenolic compounds, anhydrides or amines, can provide low viscosity, solventless compositions having a storage life of over 8 months at 25° C, i.e. viscosity remaining below 1000 cp, and gel times of about 15 to 90 minutes at 175° C; while providing cured resins with excellent tensile properties, and excellent power factors values of about 2.5% at 150° C ($100 \times \tan \delta$).

BRIEF DESCRIPTION OF THE DRAWINGS

For a better understanding of the invention, reference may be made to the accompanying drawings in which.

DESCRIPTION OF THE PREFERRED EMBODIMENTS

Figure 1:
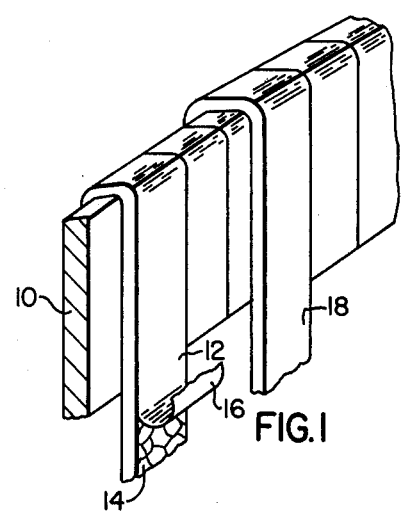
FIG. 1 is a fragmentary view in perspective, showing part of a copper coil wound with impregnated mica tape.

We have discovered that a cycloaliphatic epoxide or a glycidyl ester epoxide resin may be admixed with a reactive, low viscosity epoxide resin diluent, and a selected organo-tin compound acting as a latent catalyst, to produce solventless impregnating resins having the properties of good solvent resistance, long shelf life, low viscosity at room temperature, excellent gel times at elevated temperatures and excellent electrical and mechanical properties upon cure.

The cycloaliphatic type epoxides employed as the preferred resin ingredient in the invention are selected from non-glycidyl ether epoxides containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides or ketones to give the compound R—COOOH. These resins are well known in the art and reference may be made to Brydson, J., *Plastic Materials*, 1966, 471, for their synthesis and description.

Such non-glycidyl ether cycloaliphatic epoxides are here characterized by the absence of the ether oxygen bond, i.e. —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. The term "epoxide" as herein used in equivalent to the term "epoxy resin".

Example of non-glycidyl ether cycloaliphatic epoxides would include 3,4-epoxycyclohexylmethyl-3,4-epoxy cyclohexane carboxylate (containing two epoxide groups which are part of ring structures, and an ester linkage); vinyl cyclohexane dioxide (containing two epoxide groups, one of which is part of a ring structure); 3,4-epoxy - 6 -methylcyclohexyl methyl - 3,4-epoxy - 6 -methylcyclohexane carboxylate and dicyclopentadiene dioxide, having the following respective structures:

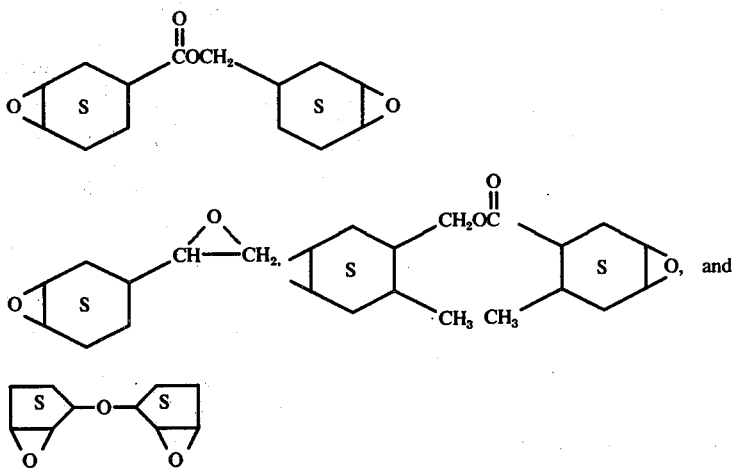

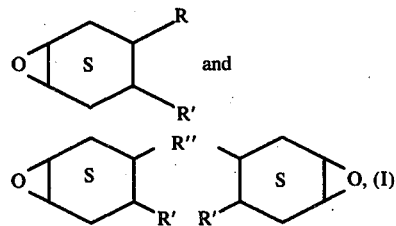

A distinguishing feature of many of the non-glycidyl ether cycloaliphatic epoxides is the location of the epoxy group(s) on a ring structure rather than on an aliphatic side chain. Generally, the cycloaliphatic epoxide particularly useful in this invention will have the formula selected from the group of:

$$\text{(I)}$$

where S stands for a saturated ring structure, R is selected from the group consisting of $CHOCH_2$, $O(CH_2)_n$-$CHOCH_2$ and $OC(CH_3)_2CHOCH_2$ radicals where $n = 1$ to 5, R' is selected from the group consisting of hydrogen, methyl, ethyl, propyl, butyl and benzyl radicals and R" is selected from the group consisting of $CH_2OOC$, and $CH_2OOC(CH_2)_4COO$ radicals.

These cycloaliphatic epoxy resins may be characterized by reference to their epoxy equivalent weight, which is defined as the weight of epoxide in grams which contains one gram equivalent of epoxy. Suitable cycloaliphatic epoxy resins have a preferred epoxy equivalent weight of from about 50 to 250. They will generally have a viscosity of between about 5 to 900 cp at 25° C.

The other type non-glycidyl ether epoxide useful in this invention are epoxy resins derived from acid groups in an epichlorohydrin reaction. These are the glycidyl esters. Generally they involve reaction of epichlorohydrin with a mono or poly carboxylic acid or the sodium or potassium salt of the acid. An alternative procedure is to react glycidyl with acid chlorides. Most commonly, the carboxyl group is reacted directly in the presence of some catalyst other than sodium hydroxide, dehydrohalogenation being accomplished after completion of the initial reaction. These glycidyl ester resins are well known in the art and reference may be made to Lee, H. and Neville, K., *Handbook Of Epoxy Resins*, 1967, 2-18, for their synthesis and complete description.

The particular glycidyl esters employed as the resin ingredient in the invention are non-glycidyl ether epoxides containing more than one 1,2 epoxy group per molecule. They are characterized by substitution of the ester bond

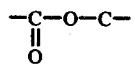

for the ether bond —O— and have the formula:

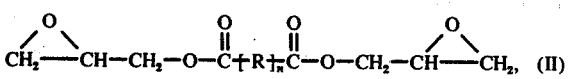

where R is an organic radical substituent selected from the group consisting of R', R'—O—R', R'—COO—R' and mixtures thereof, where R' is selected from the group consisting of alkylene groups, having from about 1-8 carbon atoms, saturated cycloalkylene groups where the ring has 4 to 7 carbons and mixtures thereof, where n is from about 1-8. Suitable glycidyl esters have a preferred epxoy equivalent weight of from about 50 to 350. They will generally have a viscosity of between about 5 cp to 900 cp at 25° C.

A reactive low viscosity epoxide diluent is used with the cycloaliphatic epoxy resin in the resinous admixture of this invention. The reactive diluent will have a viscosity range of about 0.5 cp to 50 cp and preferably about 0.5 cp to 30 cp at 27° C. The reactive epoxide diluent must be effective to allow rapid cure of the impregnant above about 120° C, i.e. it must be a true "reactive" diluent. It must be added in amounts effective to provide a viscosity of the cycloaliphatic or glycidyl ester epoxy resin of between about 5 cp to 350 cp at 25° C, and so it cannot be over about 50 cp at 27° C. It must be effective to dissolve and maintain the solubility of the organo-tin compound in the impregnant, and to counteract impregnant gelling at about room temperature, and so improve the storage stability of the impregnant.

Preferably, the latent catalyst is first mixed with the reactive diluent to form a homogeneous low viscosity latent catalytic adduct with a long storage lifetime. It is believed that the organo-tin compounds form a complex or adduct with the diluent, whereby there is partial bonding which may involve a tying up of the latent catalyst until a threshold breakdown temperature is reached at about 120° C. This combination can be stored separately and used whenever required as a unique additive to epoxide resin systems. It would be a complete substitution for phenolic, amine or anhydride curing agents and the generally associated accelerators used with such curing agents.

Useful reactive epoxide diluents include diglycidyl ethers of a glycol having from 3-12 carbon atoms between the glycidyl ether units, i.e. 3-12 carbons in the glycol unit, for example, diglycidylether of neopentyl glycol (DGENPG), diglycidylether of 1,4 butanediol. Below 3 carbons in the glycol unit and effective complexing would not take place with the organo-tin compound. Other useful reactive diluents include epoxidized oils made from triesters of glycerol and long chain unsaturated acids which have the structure:

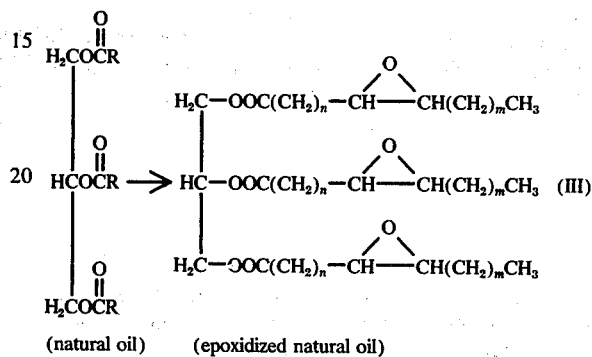

(natural oil)     (epoxidized natural oil)

where n and m range from about 6 to 12 and R represents the saturated and unsaturated acid component. The number of epoxy groups per chain will vary, but for epoxidized oils such as modified soybean oils there are an average of about 4 per chain and for epoxidized linseed oils there are an average of about 6 per chain. The epoxidized natural oils should have from about 3 to 12% by weight oxirane (epoxy) oxygen content.

DGENPG is the preferred reactive diluent. DGENPG is prepared by a two step process. The initial step reacts neopentyl glycol and epichlorohydrin in the presence of $BF_3$ to produce a chlorohydrid intermediate which is then dehydrohalogenated by sodium hydroxide or sodium aluminate to provide:

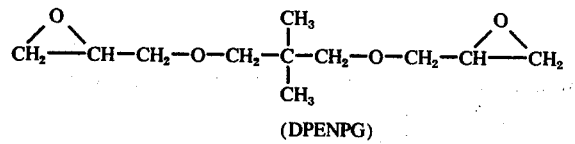

(DPENPG)

(IV)

It has been found very advantageous to cure this polymerizable resinous composition in the temperature range of about 120° to 180° C, to form hard, tough, resinous products, solely by the use of certain of the organo-tin compounds as latent catalysts, without use of anhydrides or amines. This also provides substantial cost savings.

The term "latent catalyst" is defined as a compound which can dramatically speed up gel time or curing rates at temperatures over about 120° C, even when used in very small quantities, while exhibiting little or no resin cure at temperatures of up to about 35° C, thus giving good pot life or storage properties; and which is a complete substitute for both curing agents and accelerators. In general an impregnating resin is considered usable at viscosities up to about 1000 cp at 25° C, and it is essential in commercial impregnation operations that it remain below this viscosity for at least 6 months (usable pot life). For use in impregnating multiple layers of micawrapped conductors, the resinous impregnating compositions of this invention should not have viscosities over about 350 cp at 35° C, for impregnating purposes, and to insure a long pot life by having a sufficient amount of reactive diluent present.

The useful latent catalysts for this particular combination of cycloaliphatic or glycidyl ester epoxide: reactive epoxide diluent, where no anhydride or amine is used, are covalently bonded organo-tin compounds having the general chemical structural formula:

$$R_2-\underset{\underset{R_3}{|}}{\overset{\overset{R_1}{|}}{Sn}}-X \quad (V)$$

where the $R_1$, $R_2$ and $R_3$ are organic radical substituents, each selected from the group consisting of: alkyl groups, having from about 1–10 carbon atoms; aryl groups, such as phenyl i.e.

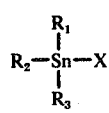

naphthyl i.e.

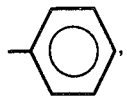

Cl, Br or $NO_2$ substituted aryl groups, such as

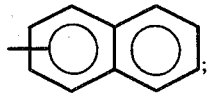

where the substituents selected from Cl, Br and $NO_2$ are substituted for hydrogens on the cyclic structure; aralkyl groups, such as

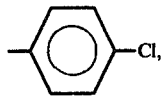

with the alkyl constituent has from about 1–10 carbon atoms; alkaryl groups, such as benzyl groups, i.e.

with the alkyl constituent having from about 1–10 carbon atoms; Cl, Br or $NO_2$ substituted alkaryl groups, such as

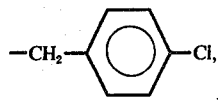

where the substituents selected from Cl, Br and $NO_2$ are substituted for hydrogens on the cyclic structure, with the alkyl constituent having from about 1–10 carbon atoms; cycloalkyl (alkylene) groups selected from cyclopentane groups, cyclopentene groups, cyclopentadiene groups, cyclohexane groups, cyclohexene groups, and cyclohexadiene groups; and heterocyclic groups selected from pyrrolidine groups

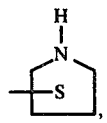

pyrrole groups

tetrahydrofuran groups

dioxane groups

pyridine groups

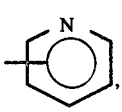

and piperidine groups

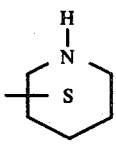

Over 10 carbons in an alkyl group leads to insolubility in the epoxy resin. Preferably, the R constituents will be selected from the group consisting of alkyl groups, benzyl groups and phenyl groups.

The X substituent is selected from the group consisting of halide, preferably Cl, hydroxide, acetate, butyrate, propionate, and dimethylphosphate. Only one X substituent is contained in useful organo-tin compounds effective as latent catalysts. If more than one X substituent is present as directly bonded to the tin atom, storage lifetime will be reduced, and upon contact with water, hydrolysis of the tin compound could result, causing a precipitate which would have a deleterious effect on impregnating, curing and on electrical properties. Examples of some suitable preferred compounds would include, for example:

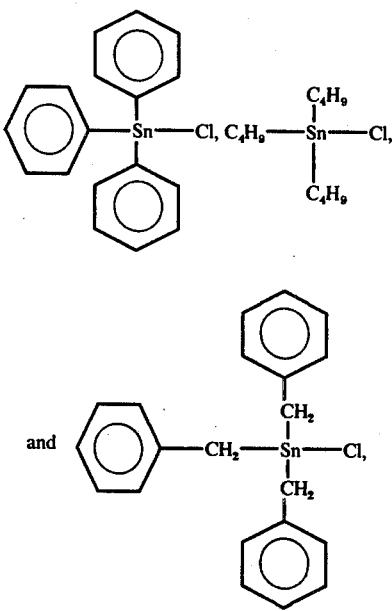

i.e. triphenyl-tin chloride; tri N-butyl-tin chloride and tribenzyl-tin chloride. Others would include, for example, trimethyl-tin chloride; triethyl-tin chloride; tripropyl-tin chloride, triphenyl-tin bromide; triphenyl-tin iodide; triphenyl-tin acetate; triphenyl-tin hydroxide; triphenyl-tin butyrate; triphenyl-tin propionate; triphenyl-tin dimethyl phosphate; tribenzyl-tin bromide; tribenzyl-tin iodide; tribenzyl-tin acetate; tribenzyl-tin hydroxide; tribenzyl-tin butyrate; tribenzyl-tin propionate; tribenzyl-tin dimethyl phosphate; trinaphthyl-tin chloride; trichlorophenyl-tin chloride, tricyclopentene-tin chloride; dibenzylphenyl-tin chloride; diphenylbenzyl-tin chloride; diphenyl-n-butyl-tin chloride and the like, with tribenzyl-tin chloride being the most preferred.

These particular organo-tin compounds were found to be very safe, non-exothermic latent catalysts. They can be used in an epoxide system that can be stored without refrigeration, i.e. they will not produce any significant temperature rise during cure and will not exothermally decompose during storage at room temperature to "kick off" the polymerization. This is extremely advantageous since the epoxide system can then be stored in tanks with capacities of up to 10,000 gallons. The covalent bonding of these compounds assures that no ionic fragments are present in the cured resin to deleteriously affect electrical properties. A complete description of the preparation of these compounds is given by Ingham R. K., Rosenberg S. D., and Gilman H., in "Organo-Tin compounds" CHEM. REVIEWS, Vol. 60, 1960, pp. 459–525, herein incorporated by reference.

These ingredients must be admixed in critical weight ratios. The resinous impregnating composition can be made by admixing: (1) 1 part by weight total epoxide having a weight ratio of cycloaliphatic or glycidyl ester epoxide: reactive, low viscosity epoxide diluent of between about about 1:0.10 to 1:0.90, i.e. between about 9 wt% to 47 wt% epoxide diluent based on the weight of epoxide plus epoxide diluent $(0.1/1.1 = 0.09)$ and (2) about 0.00005–0.0005 part by weight and perferably 0.0003–0.0005 part by weight of the specified organo-tin compounds, i.e. about 0.005 wt%–0.05 wt% based on total epoxide.

Preferably, in order to achieve a completely homogeneous mixture, the organo-tin compound, which is generally in solid form, is first mixed with the epoxide diluent, preferably without applying heat, to insure dissolution of the organo-tin compound without starting to gel the mixture. Application of heat, up to 50° C may be used to aid in dissolution although this is generally not necessary. Heating over 50° C might give a partial polymerization reaction causing a change in the viscosity of the resin. While the organo-tin compound could be added to a diluent-cycloaliphatic or glycidyl ester mixture, it would be harder to get into solution.

Less than 9 wt% diluent, based on total epoxide, and the composition will generally have a high initial viscosity and will not be particularly storable; also, the organo-tin compound will not remain soluble in the epoxide mixture. Greater than 47 wt% diluent, based on total epoxide, and electrical and tensile properties of the cured resin will start to suffer. The use of epoxide diluent within this range allows inclusion of the organo-tin component without substantial heating which would adversely affect storage stability.

Under 0.00005 part of the specified organo-tin compound per part total epoxy and the gel times will be adversely affected, since not enough catalytic effect will be generated at elevated temeratures. Over 0.0005 part of the specified organo-tin compound per part total epoxy in this particular combination system, and the pot life and thermal stability of the cured resin will start to suffer, the organo-tin compound will be difficult to dissolve in the epoxide mixture or the epoxide diluent and possible separation on storage may occur. Also, resistance to moisture attack of the cured resin may be adversely affected. Use over 0.0005 part provides no advantages and results in a distinct cost disadvantage, for example, use of 0.01 part per part total epoxide could constitute 20% of the cost of the resin system, since most of the organo-tin compounds are very expensive.

Thixotropic agents, such as $SiO_2$ in gel composition may be used as aids in thickening the composition. Similarly, various fillers, such as silica, quartz, beryllium aluminum silicate, lithium aluminum silicate, calcium carbonate, alumina trihydrate and mixtures thereof, in average particle sizes from about 10 microns to 100 microns, may be employed up to about 3 parts per part total epoxy, to improve electrical properties and cut costs of the resin formulation.

When the organo-tin compound is only to be mixed with the reactive epoxide diluent and stored separately as an additive for epoxy resins, the amount of diluent used will be the minimum amount effective to completely dissolve the organo-tin compound and provide a homogeneous, low viscosity admixture.

While applicant does not wish to be held to any particular theory; based on the behavior of Lewis Acid type catalyst with Lewis Bases, such as epoxy groups, room temperature adducts of mixtures of materials such as DGENPG epoxide diluent and organo-tin compounds, such as tribenzyl or triphenyl-tin chloride, may be formed by admixing as follows:

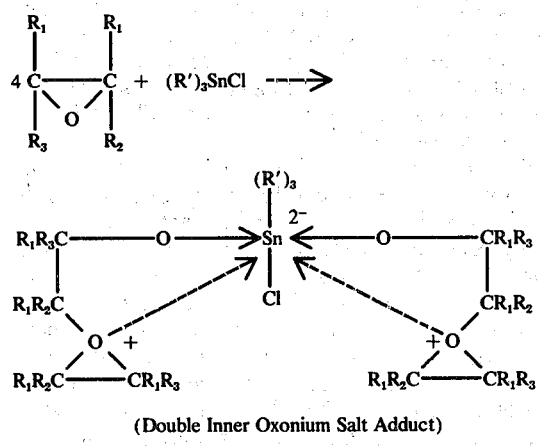

(Double Inner Oxonium Salt Adduct)

This mixture containing the more acidic epoxy materials such as DGENPG has only partial ionic character and would be stable at room temperature, but dissociate at elevated temperatures and give rise to cationic polymerization with cycloaliphatic and glycidyl ester epoxides. The rate determining step in the initiation mechanism of gellation is the breakdown or dissociation of the epoxide-organo-tin compounds to give reactive species which are able to promote polymerization of the epoxy groups. It is not determined solely by catalyst concentration. When these organo-tin compounds are mixed directly with cycloaliphatic and glycidyl ester epoxides, without epoxidized diluent, more basic intermediate and unstable complexes are formed than with the more acidic DGENPG; these not-diluent containing intermediates will quickly polymerize, even at room temperature, with resulting poor shelf life. In the case of DGENPG the adduct may be formed as follows:

$$n(DGENPG) + (R')_3SnCl \longrightarrow (R')_3SnCl\ (DGENPG)_n^{2+}\ \text{where}\ n = 2\text{–}6$$

Referring to FIG. 1 of the drawings, coil 10, shown as a single conductor strap of copper or aluminum for instance, is first wrapped with an overlapping layer of tape 12. The tape 12 comprises a micaceous layer such as mica flakes 14 and a supporting sheet backing 16 all united with a liquid resinous binder. The tape may be applied half-lapped, butted or otherwise. One or more additional layers 18 of mica tape, similar to tape 12 may be applied over tape 12. To impart better abrasion resistance and to secure a tighter insulation an outer wrapping of tape of a tough fibrous material, such as glass fiber, asbestos, or the like may be applied to the coil.

The mica tape for building coils in accordance with the present invention is prepared from a sheet backing support material upon which is disposed a layer of mica flakes. The sheet backing and the mica flakes are treated with liquid resinous binder. The mica flakes are 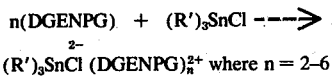 then preferably covered with another layer of sheet backing in order to protect the layer of mica flakes and to produce a more uniform insulation. This mica insulation is preferably in the form of a tape of the order of one inch in width though tapes or sheet insulation of any other width may be prepared.

For building electrical machines, the sheet backing for the tape may comprise paper, cotton fabrics, asbestos paper, glass cloth or glass fibers, mica paper or sheets or fabrics prepared from synthetic resins such as nylon, polyethylene and linear polyethylene terephthalate resins. Sheet backing material of a thickness of approximately 1 mil (0.001 in or 0.0025 cm), to which there has been applied a layer of from 3 to 10 mils thickness of mica flakes has been successfully employed. The liquid binders for the mica flakes are preferably epoxy resins that are soluble in and compatible with the resinous compositions of this invention that will be employed in subsequently impregnating the coils.

The coil with the applied layers of mica insulation is then vacuum impregnated with the liquid, completely reactive polymerizable resinous compositions of this invention. After vacuum impregnation, the insulated coil is exposed to the atmosphere, and upon the application of heat and pressure, a thermally stable, relatively flexible insulation is formed.

Coils produced by the impregnation of the mica wrapping with any of the completely reactive compositions of this invention are placed in a hot press in which the slot portions are subjected to heat and pressure for a period of time of from about one hour at 100° to 150° C to cure the resinous composition in the slot portions. The end portions of the windings will be substantially uncured. This hot pressing operation produces a coil having a slot portion of the exact size required for the electrical machine and can be fitted into the slots of the electrical machine readily with flexing of the end portions.

Figure 2:
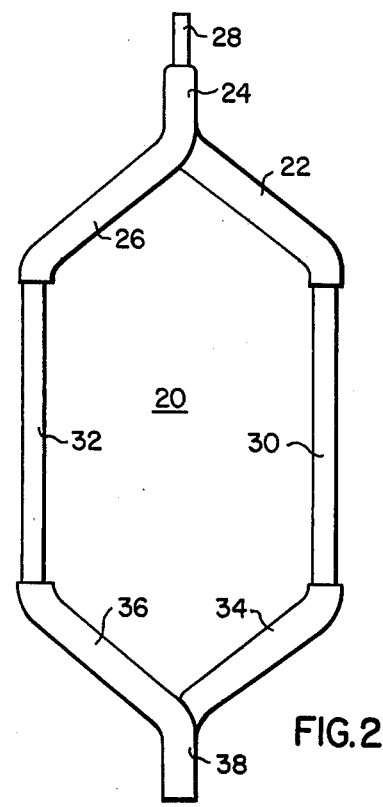
FIG. 2 is a plan view of a closed electrical coil member having two slot portions.

A closed full coil 20 prepared in accordance with the present invention is illustrated in FIG. 2. The full coil comprises an end portion comprising a tangent 22, a connecting loop 24 and another tangent 26 with bare leads 28 extending therefrom. Slot portion 30 and 32 of the coil which have been hot pressed to cure the resin and to form them to predetermined shape and size, are connected to the tangents 22 and 26, respectively. These slot portions are connected to other tangents 34 and 36 connected through another loop 38.

The complete full coils prepared as disclosed herein, with cured slot portions and uncured end portions are placed within the slots of the stator or rotor of an electrical machine and the end windings wrapped and tied together. The uninsulated leads are then soldered, welded or otherwise connected to each other or to the commutator. Thereafter, the entire machine will be placed in an oven and heated to a temperature to cure the completely reactive composition applied to the end portions.

The following non-limiting Examples 1 and 2 are illustrative of various resin formulations of this invention.

EXAMPLE 1

Nine resin formulations were made containing 70 grams of 3,4-epoxy cyclohexylmethyl-3,4-epoxy cyclohexane carboxylate, a cycloaliphatic non-glycidyl ether
g an epoxy equivalent weight of about 133 and a viscosity at 25° C of 350–450 cp (sold commercially by Union Carbide under the tradename ERL-4221), and 30 grams of neopentyl diglycidyl ether (diglycidyl ether of neopentyl glycol) having a viscosity at 27° C of about 4 cp. This provided a weight ratio of cycloaliphatic non-glycidyl ether epoxide: reactive, low viscosity epoxide diluent of 1:0.43.

The epoxide also contained various amounts of organo-tin compounds to form Samples (A)–(I):

Sample (A) also included 0.05 gram triphenyl-tin acetate. Sample *(B) also included 0.03 gram triphenyl-tin chloride. Sample ‡(C) also included 0.05 gram triphenyl-tin chloride. Sample (D) also included 0.05 gram tribenzyl-tin hydroxide. Sample (E) also included 0.05 gram tri-n-butyl-tin chloride. Sample ‡(F) also included 0.05 gram tribenzyl-tin chloride. Sample *(G) also included 0.03 gram tribenzyl-tin chloride. Sample (H) also included 0.01 gram tribenzyl-tin chloride. Sample (I) also included 0.04 gram tri-n-butyl-tin chloride and substituted 80 grams of 3,4-epoxy cyclohexylmethyl-3,4-epoxy cyclohexane carboxylate, a cycloaliphatic non-glycidyl ether epoxide having an epoxy equivalent weight of 140 and a viscosity at 25° C of 350 cp (sold commercially by Ciba under the tradename CY-179) for the ERL-4221, using only 20 grams of DGENPG. Of these organo-tin compounds, all were solids except the tri-n-butyl-tin chloride.

This provided formulations with from 0.0001–0.0005 parts organo-tin compound per 1 part total epoxy, i.e. 0.01 wt% to 0.05 wt% based on total epoxide (cycloaliphatic nonglycidyl ether epoxide plus reactive epoxide diluent). In all cases, the organo-tin compound was first completely dissolved in the reactive epoxide diluent at 25° C to form a homogeneous admixture. These admixtures having viscosity ranges from about 5 to 20 cp at 25° C and a very long storage lifetime, and which could be used as a separate storable epoxide additive, were then added to the ERL-4221 or the CY-179. These resulting cycloaliphatic epoxide formulations had initial viscosities of about 85 cp to 100 cp at 25° C. While the organo-tin compound could be added to a diluent-cycloaliphatic or glycidyl ester mixture, it would be harder to get into solution.

These samples were poured into separate containers, stired at room temperature and then each sample was put in a paint mixer and mixed for about 15 minutes. Ten grams of each sample was then poured into flat 2 inch diameter aluminum dishes. These samples were placed in ovens at various temperatures and inspected every 20 to 30 minutes to record the gel time of the samples. The approximate gel time was considered to be the amount of time it took the formulation to start to solidify (i.e. gel at about 500,000 cp).

Storage properties of the samples were found by measuring viscosities at 27° C in Gardner-Holt bubble tubes. Measurements were usually taken at 1-week intervals. The termination of the catalyzed lifetime (pot life) of these formulations was considered to be when the viscosity reached a value of 1000 cp at 25° C.

The dielectric constant and 60 Hz. power factors (100 × tan δ) were measured at 150° C. (ASTM designation D150-65T) on 120 mil thick resin castings of Samples (C) and (F), gelled at 135° C and then baked for 16 hours at 150° C. The results of the gel and electrical tests are given in Table 1.

TABLE I

| Sample | Gel Time (minutes) 135° C | 150° C | 175° C | Power Factor (100 × tan δ) | Dielectric Constant |
|---|---|---|---|---|---|
| (A) | — | — | 20–25 | — | — |
| *(B) | — | 30–40 | — | — | — |
| **(C) | 80–95 | 45–50 | 35–40 | 2.5% | 3.94 |
| (D) | — | — | 15–20 | 2.1% | 4.70 |
| (E) | — | — | 20–25 | — | — |
| **(F) | 40–45 | 25–30 | 15–20 | 2.5% | 3.97 |
| *(G) | — | 20–30 | — | — | — |
| (H) | — | 65–75 | — | — | — |
| (I) | — | 25–30 | 15–20 | — | — |

Gel times below 90 minutes at 175° C and Power Factor values below 8% at 150° C are considered excellent for cured resin samples.

Figure 3:
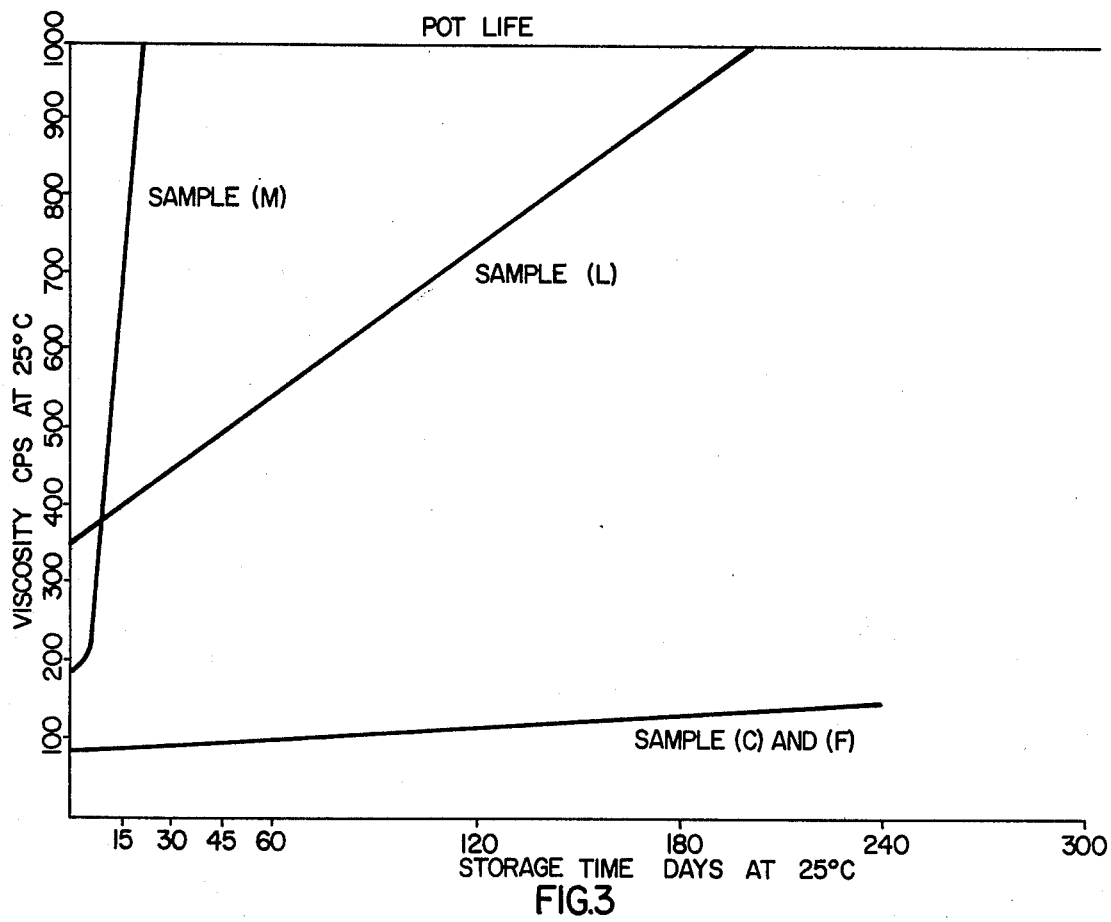
FIG. 3 is a comparative graph, showing the pot life of various resin formulations.

FIG. 3 shows the pot life of Samples (C) and (F). As can be seen the pot life at 25° C, time to go over 1000 cp, is at least about 260+ days. Thus, these organo-tin compounds are excellent latent catalysts. As can be seen, the tribenzyl-tin chloride, Sample (F) and (G) are preferred over triphenyl-tin chloride, Samples (C) and (B) and the other compounds tested, providing better gel times and comparable electrical properties and pot life. Sample (F), 0.05 TBTCl provided 25–30 min at 150° C; Sample (G), 0.03 TBTCl provided 20–30 min at 150° C whereas Sample (C), 0.05 TPTCl provided 45–50 min at 150° C and Sample (B), 0.03 TPTCl provided 30–40 min at 150° C also indicating better results in both cases at the lower 0.03 wt% tin compound concentrations.

The resin formulations have also been used as a solventless varnish in sheet mica insulation and tested as sheet insulation for coils in electric motors. Power Factor values for cured Sample (F) resin on mica flake insulation were 3.9% at 150° C (100 × tan δ), where values below 10% are considered excellent for cured coatings on mica flakes.

Experimental data with 2,300 volt coils using 6 wt% cycloaliphatic epoxy resin binder for mica tape having a Dacron (polyethylene terephthalate) backing and impregnated with the Sample (F) varnish of this invention, provided average power factor values at 150° C (100 × tan δ) of 16%, when the applied voltage was 2,000 volts; where values below 20% are considered excellent for impregnated mica flake backed insulation on low voltage coils under voltage stress.

Other cycloaliphatic resins as described hereinabove would provide equally good results as the ERL-4221 or CY-179 used in this illustrative example, just as the diglycidyl ether of 1,4 butanediol and the epoxidized natural oil diluents described hereinabove would also be effective as a diluent; likewise, the other latent accelerators described hereinabove, such as those containing alkyl, substituted benzyl, substituted aryl, alkaryl, aralkyl, cycloalkyl, heterocyclic, bromine, fluorine, iodine, butyrate, propionate and dimethyl phosphate groups would be effective latent catalysts; these ingredients being added similarly as their counterparts above.

EXAMPLE 2

A resin formulation, Sample (J), was made by adding 0.05 gram of solid tribenzyl-tin chloride to 10 grams of neopentyl diglycidyl ether and mixing the ingredients to effectively dissolve the tribenzyl-tin chloride in the diluent at 25° C to form a homogeneous admixture.

This adduct was a stable composition having a viscosity of about 5 cp–15 cp, which could be stored almost indefinitely without gelling. The adductor admixture was added to 90 grams of a glycidyl ester resin having a structure similar to formula (II) above, where R' is a saturated cycloalkylene group having 6 carbons, having an epoxy equivalent weight of about 152 and a viscosity at 25° C of 230 cp (sold commercially by Celanese under the tradename (GLY-CEL C-200).

This provided a formulation with 0.005 part organo-tin compound per 1 part total epoxy and a weight ratio of glycidyl ester epoxide:low reactive, viscosity epoxide diluent of 1:0.11, i.e. 10 wt% diluent. The formulation had an initial viscosity of about 180 to 185 cp at 25° C.

The formulation was poured into a container, stirred at room temperature and then mixed for about 15 minutes. About 10 grams was poured into a flat aluminum dish and put in an oven at 175° C. The gel time of this formulation was 75 to 90 minutes. While the gel time is not as fast as the cycloaliphatic epoxide systems of EXAMPLE 1, this formulation provides a very useful impregnating composition. The pot life values should be comparable to the samples in EXAMPLE 1.

EXAMPLE 3

As a comparative Example, Sample (K) was made containing a bisphenol A epoxy resin; Sample (L) was made without an reactive epoxide diluent; Sample (M) was made containing an anhydride curing agent; Sample (N) was made containing an organo-lead compound; Sample (O) was made containing an organo-tin dihalide; Sample (P) was made containing an organo-tin trihalide; Sample (Q) was made containing an organo-tin oxide.

In Sample (K), 70 grams of a pure, liquid diglycidyl ether of bisphenol A, having an epoxy equivalent weight of about 172–176 and a viscosity of 4000–5500 cp at 25° C (sold commercially by Dow Chemical Co. under the trade-name DER 332) was mixed with 30 grams of neopentyl diglycidyl ether and 2.0 grams of tribenzyl tin chloride. The organo-tin compound was initially dissolved in the DGENPG, at 25° C, the mixture was then added to the bisphenol A epoxy. This formulation had an initial viscosity of about 280 cp to 290 cp at 25° C.

In Sample (L), 100 grams of ERL-4221 cycloaliphatic non-glycidyl ether epoxide (E.E. wt = 133; 350–400 cp at 25° C) was mixed with 0.05 gram of triphenyl-tin chloride. No diluent was used. This formulation had an initial viscosity of about 350 cp to 360 cp at 25° C.

In Sample (M), 100 grams of ERL-4221 cycloaliphatic non-glycidyl ether epoxide (E.E. wt = 133; 350–400 cp at 25° C) was mixed with 125 grams of 1-methyltetrahydrophthalic anhydride curing agent and 0.05 gram of tribenzyl-tin chloride. No diluent was used. This formulation had an initial viscosity of about 170 cp to 190 cp at 25° C.

In Samples (N), (O), (P) and (Q), 70 grams of ERL-4221 cycloaliphatic non-glycidyl ether epoxide (E.E. wt = 133; 350–400 cp at 25° C) was mixed with 30 grams of neopentyl diglycidyl ether and 1.0 gram respectively of triphenyl-lead chloride, diphenyl-tin dichloride, phenyl-tin trichloride and tri-n-butyl-tin oxide. The organo-tin compounds were initially dissolved in the DGENPG, the mixture was then added to the ERL-4221.

The gel times were: Sample (K) = 120+ minutes at 150° C; Sample (L) = 30–40 minutes at 175° C; Sample (M) = 65–85 minutes at 150° C; Sample (N) = 120+ minutes at 150° C; Sample (O) = 20 minutes at 175° C; Sample (Q) = 130 minutes at 175° C. FIG. 3 shows the pot life of Samples (C), (F), (L) and (M). As can be seen the pot life at 25° C, for Samples (C) and (F) is at least about 280 days; the pot life for Sample (L) was about 200 days and the pot life for Sample (M) was about 20 days. The pot life for Sample (O) was 60 days at 25° C with precipitate formation. Sample (P) gave an instantaneous gel at room temperature showing that organo-tin trihalides are totally unacceptable as latent catalysts.

Thus, the gel time for Sample (K) indicates that the organo-tin compounds are not particularly effective latent catalyst with diglycidyl ethers of bisphenol A even when used in large amounts with reactive diluents. It would appear that the bisphenol A aromatic groups in combination with ether lingages provide a resinous system which is not particularly compatible with the Lewis Acid type organo-tin catalysts. While gel times of Sample (L) are quite good, the pot life values are marginal, indicating that the reactive epoxy diluent contributes greatly to improving storage stability. It would appear that the reactive epoxide diluent forms a stable adduct with the organo-tin compound, so that the catalytic effect is hindered until a threshold breakdown temperature is reached.

Sample (M) provided acceptable gel times but commercially unacceptable pot life values, indicating that an anhydride system does not provide the excellent storage stability that the industry is seeking. Our formations do not require the use of a carboxylic acid anhydride curing agent. The organo-tin compounds perform the dual function of giving fast gel times and also full cure of the resin by catalytic interaction. This unusual feature can have great economic advantages over anhydride systems since the anhydride curing agent is usually a very significant portion of the impregnant composition cost.

Sample (N) shows that the organo-tin compounds are particularly suitable as latent catalysts. Here an organo-lead compound, even when used in large amounts, provided commercially unacceptable gel times. Sample (O) shows that while dihalides provide suitable gel times, they may hydrolyze to form precipitates causing a loss in catalytic effectiveness. Precipitates would also severely hamper impregnation. Sample (Q) provided unacceptable gel times even when used in large amounts. Thus, only selected organo-tin compounds as described hereinabove are useful in this particular long life, high electrical performance epoxide impregnating mixture.

The rate of viscosity change at room temperature was: Sample (A) = 0.24 cp/day; Sample (F) = 0.19 cp/day; Sample (L) = 3.2 cp/day; and Sample (M) = 40 cp/day.

We claim:
1. A resinous composition consisting essentially of:
   A. an epoxide mixture having a weight ratio of non-glycidyl ether epoxide containing more than one 1,2 epoxy group per molecule selected from the group consisting of cycloaliphatic epoxides and glycidyl ester epoxides: reactive low viscosity epoxide diluent containing more than one 1,2 epoxy group per molecule, of between about 1:0.10 to 1:0.90; and

B. an amount of an organo-tin compound, acting as a latent catalyst, selected from compounds having the structural formula:

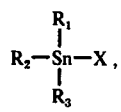

wherein $R_1$, $R_2$ and $R_3$ are selected from the group consisting of alkyl groups having from about 1 to 10 carbon atoms, aryl groups, Cl, Br, or NO2 substituted aryl groups, alkaryl groups with the alkyl constituent having from about 1–10 carbon atoms, Cl, Br, or NO2 substituted alkaryl groups with the alkyl constituent having from about 1–10 carbon atoms, aralkyl groups with the alkyl constituent having from about 1–10 carbon atons, cyclopentane groups, cyclopentene groups, cyclopentadiene groups, cyclohexane groups, cyclohexene groups, cyclohexadiene groups, pyrrolidine groups, pyrrole groups, tetrahydrofuran groups, dioxane groups, pyridine groups, and piperidine groups, and X is selected from the group consisting of halide, hydroxide, acetate, butyrate, propionate and dimethyl phosphate, to be effectively dissolved in the epoxide mixture.

2. The resinous composition of claim 1 wherein the organo-tin compound is selected from compounds having the structural formula:

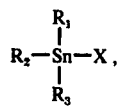

wherein
$R_1$, $R_2$ and $R_3$ are selected from the group consisting of alkyl groups having from about 1 to 10 carbon atoms, benzyl groups and phenyl groups and wherein the organo-tin compound is present in the range of about 0.00005 to 0.0005 part per 1 part epoxide mixture.

3. The resinous composition of claim 2 wherein the composition is a mixture of (1) an admixture of organo-tin compound plus reactive epoxide diluent; and (2) non-glycidyl ether epoxide, and the non-glycidyl ether epoxide is a cycloaliphatic epoxide having an epoxy equivalent weight of between about 75 to 250 and a viscosity of between about 50 cp to 900 cp at 25° C.

4. The resinous composition of claim 2 wherein the epoxide reactive diluent has a viscosity of between about 0.5 cp to 50 cp at 27° C and is effective to allow rapid cure of the composition above 120° C and maintain solubility of the organo-tin compound in the epoxide mixture, and the organo-tin compound is tribenzyl-tin chloride.

5. A resinous composition consisting of:
about 1 part by weight epoxide mixture having a weight ratio of non-glycidyl ether epoxide containing more than one 1,2 epoxy group per molecule, selected from the group consisting of cycloaliphatic epoxides having an epoxy equivalent weight of between about 75 to 250 and a viscosity of between about 50 cp to 900 cp at 25° C and glycidyl ester epoxides having an epoxy equivalent weight of between about 50 to 350 and a viscosity of between about 5 cp to 900 cp at 25° C:reactive epoxide diluent containing more than one 1,2 epoxy group per molecule, of between about 1:0.10 to 1:0.90, wherein the epoxide diluent has a viscosity of between about 0.5 cp to 50 cp at 27° C and is selected from the group consisting of diglycidyl ethers of a glycol having from 3–12 carbon atoms between the glycidyl ether units and epoxidized oils having an oxirane content of from about 3 to 12 wt% made from triesters of glycerol and long chain unsaturated acids, and about 0.00005 to 0.0005 part by weight of an organo-tin compound, acting as a latent catalyst, selected from compounds having the structural formula:

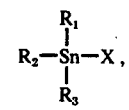

wherein $R_1$, $R_2$ and $R_3$ are selected from the group consisting of alkyl groups having from about 1 to 10 carbons atoms, benzyl groups and phenyl groups, and X is selected from the group consisting of halide, hydroxide, acetate, butyrate, propionate and dimethyl phosphate.

6. The composition of claim 5 wherein the composition is a mixture of (1) an admixture of organo-tin compound plus reactive epoxide diluent; and (2) cycloaliphatic epoxide, the diglycidyl ether of a glycol is selected from the group consisting of neopentyl glycol and the diglycidyl ether of 1,4 butanediol, the organo-tin compound is tribenzyl-tin chloride, and the composition has a viscosity between about 5 cp to 350 cp at 25° C.

7. A method of making a resinous impregnating varnish comprising the steps of:
A. mixing an organo-tin compound acting as a latent catalyst, selected from compounds having the structural formula:

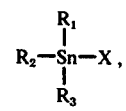

wherein $R_1$, $R_2$ and $R_3$ are selected from the group consisting of alkyl groups having from about 1 to 10 carbon atoms, aryl groups, Cl, Br or $NO_2$ substituted aryl groups, alkaryl groups with the alkyl constituent having from about 1–10 carbon atoms, Cl, Br or $NO_2$ substituted alkaryl groups with the alkyl constituent having from about 1–10 carbon atoms, aralkyl groups with the alkyl constituent having from about 1–10 carbon atoms, cyclopentane groups, cyclopentene groups, cyclopentadiene groups, cyclohexane groups, cyclohexene groups, cyclohexadiene groups, pyrrolidine groups, pyrrole groups, tetrahydrofuran groups, dioxane groups, pyridine groups and piperidine groups, and X is selected from the group consisting of halide, hydroxide, acetate, butyrate, propionate and dimethyl phosphate, with an amount of a low viscosity reactive epoxide diluent containing more than one 1,2 epoxy group per molecule, effective to dissolve the organo-tin compound without heating above 50° C, and then adding this mixture to B. a non-glycidyl ether epoxide containing more than one 1,2 epoxy group per molecule, selected from the group consisting of cycloaliphatic epoxides and glycidyl ester epoxides, wherein the weight ratio of non-glycidyl ether epoxide:reactive epoxide diluent is between about 1:0.10 to 1:0.90 in the epoxide mixture.

8. The method of claim 7 wherein the organo-tin compound is selected from compounds having the structural formula:

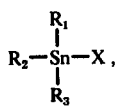

wherein
$R_1$, $R_2$ and $R_3$ are selected from the group consisting of alkyl groups having from about 1 to 10 carbon atoms, benzyl groups and phenyl groups, and wherein the organo-tin compound is present in the range of about 0.00005 part to 0.0005 part per 1 part epoxide mixture.

9. The method of claim 8 wherein the epoxide is a cycloaliphatic epoxide having an epoxy equivalent weight of between about 75 to 250 and a viscosity of between about 50 to 900 cp at 25° C, the reactive epoxide diluent has a viscosity of between about 0.5 cp to 50 cp at 27° C and the organo-tin compound is tribenzyl-tin chloride.

10. An admixture consisting of:
A. an organo-tin compound selected from compounds having the structural formula:

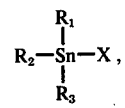

wherein $R_1$, $R_2$, and $R_3$ are selected from the group consisting of alkyl groups having from about 1 to 10 carbon atoms, benzyl groups and phenyl groups and X is selected from the group consisting of halide, hydroxide, acetate, butyrate, propionate and dimethyl phosphate and, B. an amount of a low viscosity reactive epoxide diluent containing more than one 1,2 epoxy group per molecule, effective to dissolve the organo-tin compound at temperatures up to about 50° C to form a homogeneous admixture.

11. The resinous catalytic additive of claim 10 wherein the diluent has a viscosity of between about 0.5 cp to 50 cp at 27° C.

12. The resinous catalytic additive of claim 11, wherein the diluent is selected from the group consisting of diglycidyl ethers of a glycol having from 3–12 carbon atoms between the glycidyl ether units and epoxidized oils having an oxirane content of from about 3 to 12 wt% made from triesters of glycerol and long chain unsaturated acids.

13. The resinous catalytic additive of claim 12, wherein the X is selected from the group consisting of Cl, hydroxide and acetate.

14. The resinous catalytic additive of claim 12, wherein the organo-tin compound is selected from the group consisting of triphenyl-tin chloride and tribenzyl-tin chloride.

15. The resinous catalytic additive of claim 14, wherein the diluent is selected from the group consisting of the diglycidyl ether of neopentyl glycol and the diglycidyl ether of 1,4 butanediol and the organo-tin compound is tribenzyl-tin chloride.

* * * * *